(12) United States Patent
Mitra et al.

(10) Patent No.: US 9,613,367 B2
(45) Date of Patent: Apr. 4, 2017

(54) ASSESSMENT OF USERS FEEDBACK DATA TO EVALUATE A SOFTWARE OBJECT

(71) Applicants: Abhijit Mitra, Los Altos, CA (US); Peter Pieruschka, Walldorf (DE); Sangita Purkayastha, Bangalore (IN); Ponmurughu S, Bangalore (IN); Madhubala Vanam, Bangalore (IN)

(72) Inventors: Abhijit Mitra, Los Altos, CA (US); Peter Pieruschka, Walldorf (DE); Sangita Purkayastha, Bangalore (IN); Ponmurughu S, Bangalore (IN); Madhubala Vanam, Bangalore (IN)

(73) Assignee: SAP SE, Walldorf (DE)

( * ) Notice: Subject to any disclaimer, the term of this patent is extended or adjusted under 35 U.S.C. 154(b) by 422 days.

(21) Appl. No.: 13/913,516

(22) Filed: Jun. 10, 2013

(65) Prior Publication Data

US 2014/0365397 A1    Dec. 11, 2014

(51) Int. Cl.
   *G06Q 30/02*    (2012.01)

(52) U.S. Cl.
   CPC .................. *G06Q 30/0282* (2013.01)

(58) Field of Classification Search
   CPC ... G06F 11/36; G06F 11/3604; G06F 11/3664
   See application file for complete search history.

(56) References Cited

U.S. PATENT DOCUMENTS

| | | |
|---|---|---|
| 6,088,679 A | 7/2000 | Barkley |
| 6,199,193 B1 | 3/2001 | Oyagi et al. |
| 6,473,794 B1 * | 10/2002 | Guheen ............... H04L 41/22 709/223 |
| 6,574,614 B1 | 6/2003 | Kesel |
| 7,251,787 B2 | 7/2007 | Levin et al. |
| 8,095,911 B2 | 1/2012 | Ronen et al. |
| 8,234,619 B2 | 7/2012 | Polly et al. |
| 8,423,954 B2 | 4/2013 | Ronen et al. |
| 8,452,786 B2 | 5/2013 | Klinker et al. |
| 8,745,583 B2 | 6/2014 | Ronen et al. |

(Continued)

OTHER PUBLICATIONS

Xiaochun Wang, Yuanchun Shi; UMDD: User Model Driven Software Development; Embedded and Ubiquitous Computing, 2008. EUC '08. IEEE/IFIP International Conference; Dec. 17-20, 2008; pp. 477-483; vol. 1; Conference Publications, Shanghai.

*Primary Examiner* — Andrey Belousov
*Assistant Examiner* — Seth A Silverman

(57) ABSTRACT

In one embodiment, feedback data of a software object is received through a sequence of cascaded GUIs. The cascaded GUIs include an interaction portion to receive the feedback data from users at a plurality of feedback levels. Further, user role weightings of the users, account weightings of enterprises associated with the users and a time weighting corresponding to a life-cycle phase of the software object are retrieved. Furthermore, average rating of the software object corresponding to each feedback level is determined as a function of the user role weightings, the account weightings, the time weighting, the feedback data corresponding to a feedback level and a number of users submitted the feedback data. The determined average ratings and rating distribution corresponding to each feedback level are graphically displayed on the interaction portion associated with a next feedback level.

17 Claims, 11 Drawing Sheets

(56) References Cited

U.S. PATENT DOCUMENTS

| | | | |
|---|---|---|---|
| 8,805,774 B2 | 8/2014 | Boyer et al. | |
| 8,832,580 B2 | 9/2014 | Jambor-Sadeghi | |
| 2005/0097516 A1* | 5/2005 | Donnelly, II | G06Q 30/02 |
| | | | 717/124 |
| 2007/0271246 A1* | 11/2007 | Repasi | G06F 17/30864 |
| 2008/0178144 A1 | 7/2008 | Bazigos et al. | |
| 2009/0228789 A1* | 9/2009 | Brugler | G06F 11/3664 |
| | | | 715/700 |
| 2012/0109714 A1* | 5/2012 | Azar | G06Q 30/0203 |
| | | | 705/7.32 |
| 2014/0208288 A1 | 7/2014 | Wuchner | |
| 2014/0258197 A1 | 9/2014 | Davulcu et al. | |
| 2014/0282400 A1 | 9/2014 | Moorthi et al. | |

* cited by examiner

FIG. 5

PRODUCT A QUESTIONNAIRE

YOUR FEEDBACK ON PRODUCT A IS APPRECIATED

1. USABILITY: HOW USABLE DO YOU FIND THE PRODUCT?

○ POOR    ○ MODERATE    ○ GOOD    ○ VERY GOOD    ○ EXCELLENT

2. PERFORMANCE: HOW IS THE PERFORMANCE OF THE PRODUCT?

○ POOR    ○ MODERATE    ○ GOOD    ○ VERY GOOD    ○ EXCELLENT

3. AVAILABILITY: HOW IS THE AVAILABILITY OF THE PRODUCT?

○ POOR    ○ MODERATE    ○ GOOD    ○ VERY GOOD    ○ EXCELLENT

4. FUNCTIONAL COMPLETENESS: HOW DO YOU RATE FUNCTIONAL COMPLETENESS OF THIS PRODUCT?

○ POOR    ○ MODERATE    ○ GOOD    ○ VERY GOOD    ○ EXCELLENT

[ DONE ]

WHAT OTHERS ARE THINKING — 810

SOFTWARE PRODUCT A — 900

RATING OF: SOFTWARE FEATURE ▼ | CONFIGURATION MANAGEMENT ▼ | ⭐⭐⭐⭐⭐

AVAILABILITY AND PERFORMANCE MANAGEMENT | OPERATION MANAGEMENT | CONFIGURATION MANAGEMENT

SECURITY | INFRASTRUCTURE

IDENTITY MANAGEMENT
THE USER MANAGEMENT CENTRALIZED USER MANAGEMENT APPLICATIONS AND C... WITH USER MANAGEMENT SOURCES.

SPNEGO CONFIGURATION
STEP-BY-STEP WIZARD BASED CROSS-PLATFORM SIMPLE AND PROTECTED (SPNEGO).

CURRENT QUESTIONNAIRE STATISTICS – PRODUCT A
910

EVALUATIONS BASED ON 276 USERS

☐ USABILITY
▦ PERFORMANCE
▨ AVAILABILITY
▩ FUNCTIONAL COMPLETENESS (bar chart: POOR, MODERATE, GOOD, VERY GOOD, EXCELLENT; y-axis 0–50)
920

PLEASE HELP IMPROVING PRODUCT A BY SUGGESTING DEVELOPMENT FEATURE

[ CANCEL ] — 930

FIG. 9

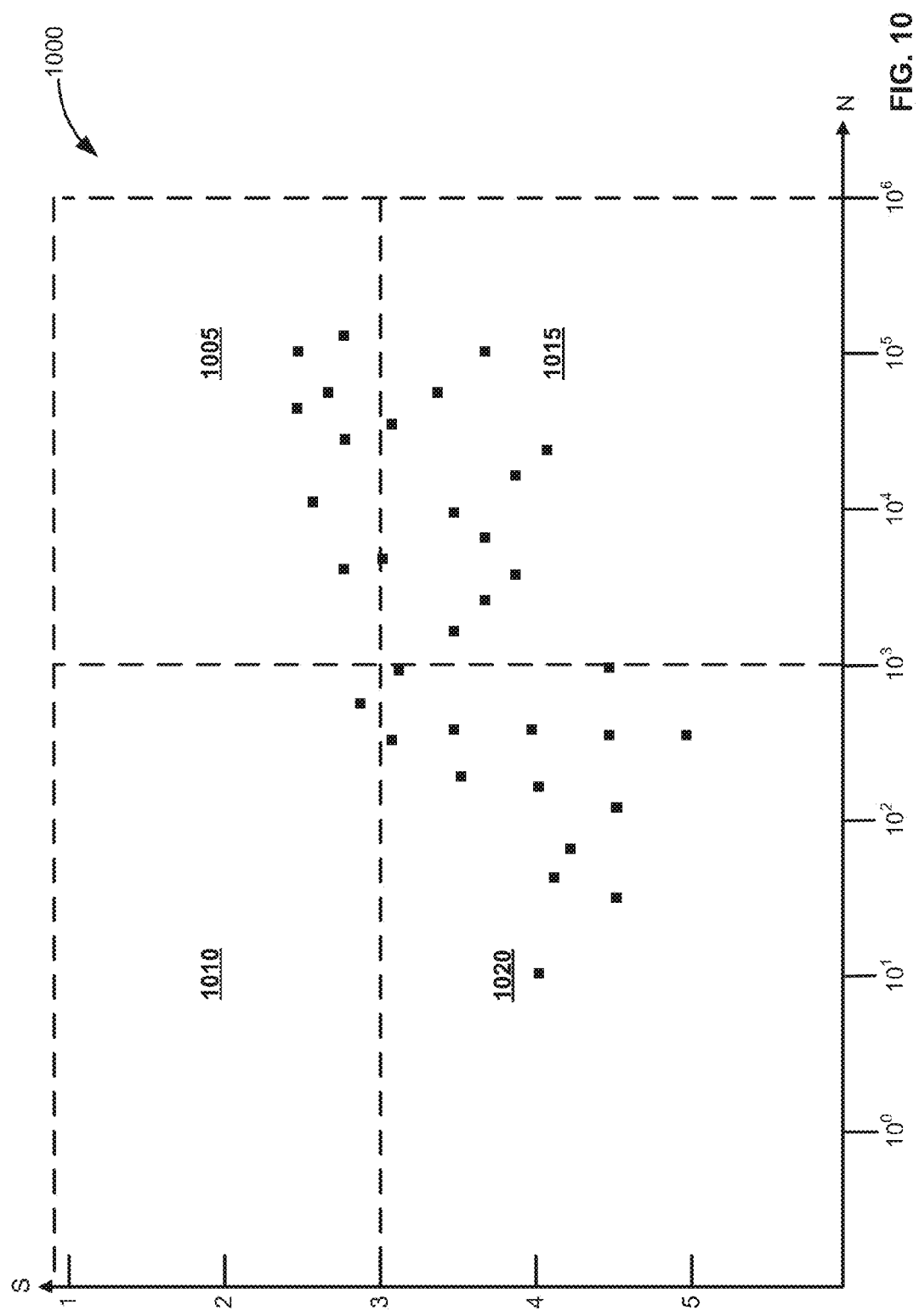

ASSESSMENT OF USERS FEEDBACK DATA TO EVALUATE A SOFTWARE OBJECT

FIELD

Embodiments generally relate to computer systems and more particularly to methods and systems to provide a systematic way of assessing users' feedback data to evaluate a software object.

BACKGROUND

Today, software developers or software providers strive continually to improve and refine their software products to remain competitive. On the other hand, with a significant number of software products available in market, it may be difficult for customers to choose a suitable software product. Therefore, for the software developers as well as for the customers investing in software, it is instrumental to know how users feel about the software product so that future directions in development and investment can be effective and easier.

Conventional methods of assessing feedback data of software products have significant disadvantages. For example, it is not clear which aspects of software are evaluated, so that often only the most obvious aspect (e.g., user interface (UI)) gets rated, while the software has many more qualities than the UI. Another fundamental shortcoming is the lack of correlation between the feedback data and level of global usage of the software. Further, the software developers could be able to submit a large number of high ratings, or feedback data with excessive or untrue praise, for their own software product. Hence, potential users or customers may find it difficult to determine whether or not reviewer ratings are meaningful, significant or even genuine.

Thereby the customers may find it difficult to determine the quality of the software product before viewing or using the software product, if the feedback data does not detail exactly which aspect of a software object has been evaluated, by whom the evaluation was performed, in which life-cycle phase of the software object an evaluation took place and so on. Further, the users may be required to manually research each potential review comment, read web forums and the like, corresponding to the software product and use their own judgment. Therefore, there is no systematic approach to valuate user feedback data on the software product and evaluate the software product based on the user feedback data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 is an exemplary GUI displaying determined average rating of a software object corresponding to a first feedback level, according to an embodiment.

FIG. 8 is an exemplary GUI displaying a set of questionnaire associated with a software object, according to an embodiment.

FIG. 9 is an exemplary GUI displaying an option to input feedback data at a third feedback level, according to an embodiment.

FIG. 10 is an exemplary graphical representation illustrating correlation between a number of users and an average rating of a software object, according to an embodiment.

DETAILED DESCRIPTION

Embodiments of techniques to assess users' feedback data to evaluate a software object are described herein. According to various embodiments, the software object can be, but not limited to a software product, a software fractional unit, a software feature, a business process, a user interface (UI) page. Also, the software object can be a semantic software entity. The software product is a collection of software that can be acquired by customers as a unit to execute a business application (e.g., SAP NetWeaver®). The software functional unit specifies a set of functionality that explicitly can be brought into operation within a system landscape (e.g., SAP Net Weaver Administrator). The software feature is a notable property of a device or software application (e.g., Configuration Management). The business process is a sequence of activities that produce a specific service or product for one or more customers (e.g., Security Management).

In one embodiment, the users' feedback data of the software product is captured through a sequence of cascaded GUIs at a plurality of feedback levels. Further, the software object is evaluated at each feedback level based on the feedback data corresponding to a feedback level and other parameters associated with the feedback data describing sensitivity of the feedback data. The parameters may include a role of users submitting the feedback data, an account type of enterprises associated with the users, a life-cycle phase of the software object, and a number of users who submitted the feedback data. Furthermore, the determined average ratings corresponding to each feedback level is displayed graphically on an interaction portion associated with a next feedback level on user's display device. Since the determined average rating of the software object is based on the feedback data and also on the parameters, software developers as well as customers can rely on the presented weighted average rating and can easily draw conclusions about aspects of the software object. Further, the software developers can learn from the determined average rating while developing future software objects and also the customers can easily choose suitable software objects.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Figure 1:
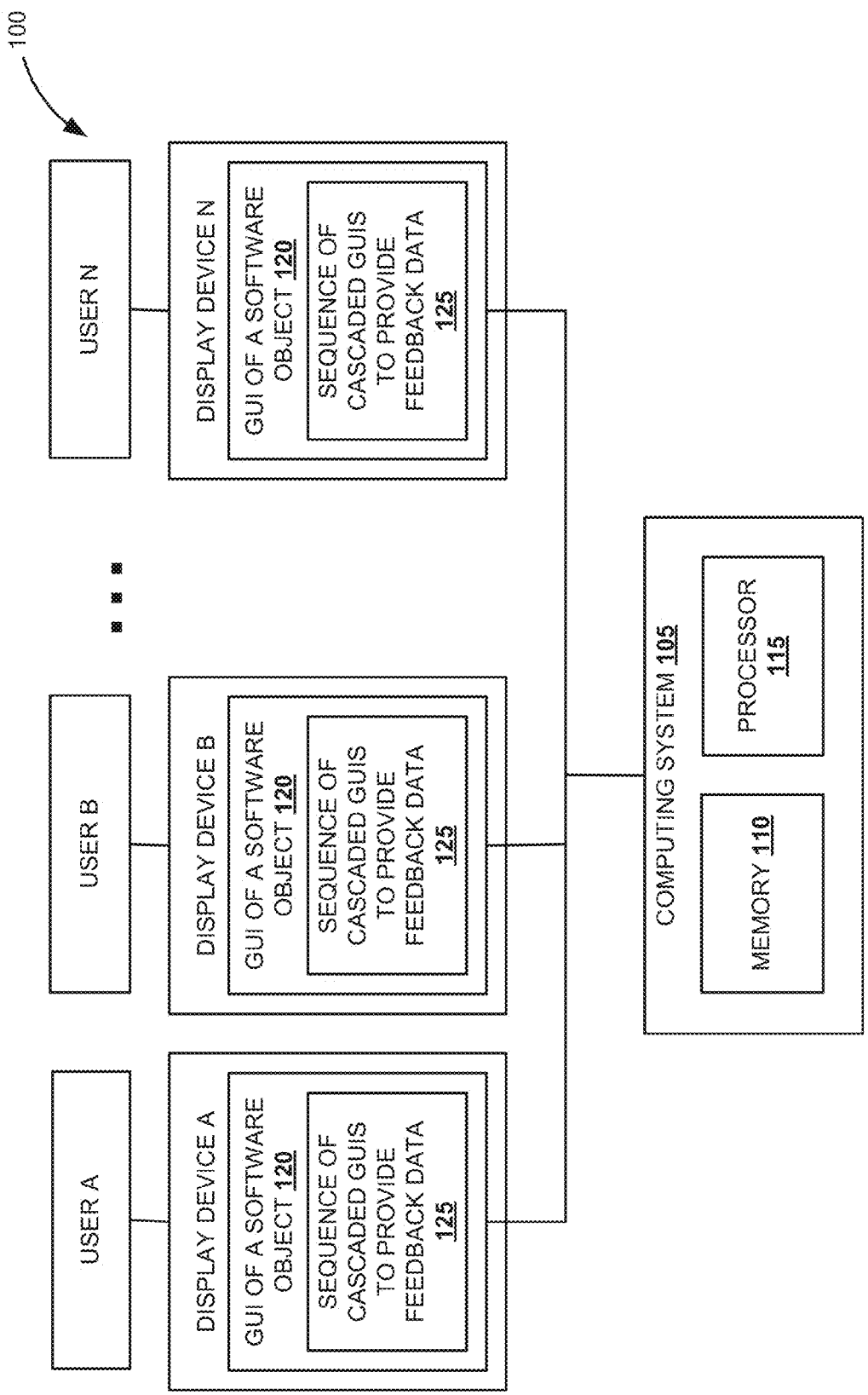
FIG. 1 is a block diagram illustrating a systematic way of assessing users' feedback data to evaluate a software object, according to an embodiment.

FIG. 1 is a block diagram 100 illustrating a systematic way of assessing users' feedback data to evaluate a software object, according to an embodiment. The block diagram 100 includes one or more users (e,g., users A to N) accessing graphical user interface (GUI) of the software object 120 through corresponding display devices (e.g., display devices A to N). In one embodiment, the users (e.g., users A to N) provide the feedback data of the software object through a sequence of cascaded GUIs 125. The sequence of cascaded GUIs 125 includes an interaction portion to capture the feedback data from the users (e.g., users A to N) systematically at a plurality of feedback levels. The sequence of cascaded GUIs is described in greater detail in FIG 2.

In one embodiment, the block diagram 100 includes a computing system 105, having a memory 110 and a processor 115 to execute instructions stored in the memory 110, to evaluate the software object based on the users' feedback data and one or more parameters. The parameters include users' role, accounts of enterprises associated with the users, a status or a life-cycle phase of the software object and a number of users submitting the feedback data. In one exemplary embodiment, each of the parameters is measured through corresponding weightings. Further, user role weightings of the users, account weightings of enterprises associated with the users and a time weighting corresponding to the life-cycle phase of the software object may be retrieved from the memory 110. The method obtaining the parameters is described in greater detail in FIG. 3.

In one embodiment, the software object is evaluated by determining an average rating of the software object corresponding to each feedback level by the processor 115. The average rating of the software object is determined as a function of the user role weightings, the account weightings, the time weighting, the feedback data corresponding to a feedback level and the number of users who submitted the feedback data. Further, the determined average ratings corresponding to each feedback level is displayed graphically on the interaction portion associated with a next feedback level on the user's display device (e.g., display devices A to N), which is described with examples in FIG. 3. Therefore, by determining the average rating of the software object as mentioned can substantially change the way in which the software object is developed in future, as it can provide statistically robust and detailed data on what is popular or unpopular about the software object. Similarly, it can influence customers in making decisions related to purchasing the software object, as the presented average rating will empower the customers to view how other users or even peer customers feel about the software object.

Figure 2:
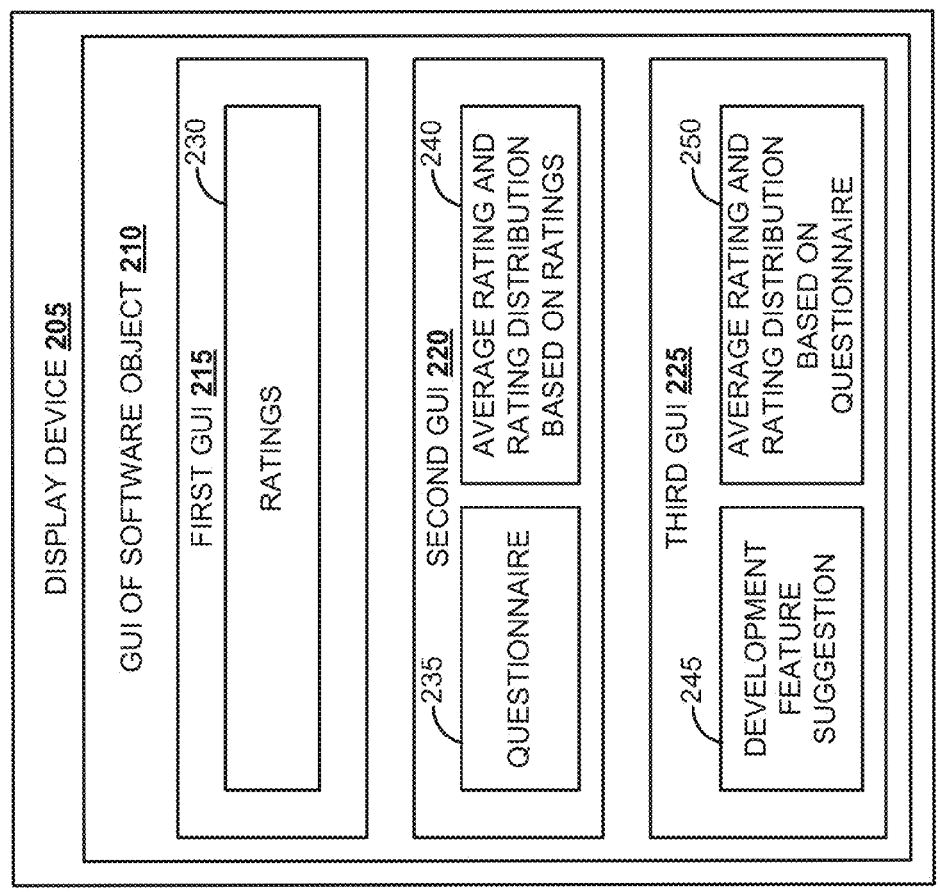
FIG. 2 is a block diagram illustrating a sequence of cascaded graphical user interfaces (GUIs) to systematically capture users' feedback data of a software object, according to an embodiment.

FIG. 2 is a block diagram 200 illustrating a sequence of cascaded graphical user interfaces (GUIs) to systematically capture users' feedback data of a software object, according to an embodiment. A display device 205 of a user provides an option for the user to input the feedback data of the software object through the sequence of cascaded GUIs displayed on a GUI of the software object 210. In one embodiment, the cascaded GUIs include an interaction portion to receive the feedback data from users at a plurality of feedback levels. Further, the cascaded GUIs are arranged so that they overlap each other with title bars corresponding to the software object and the feedback levels are displayed.

At a first feedback level, a first GUI 215 enables the user to input the feedback data of the software object through rating (e.g., 230) the software object. For example, a user can rate the software object by assigning a number of stars to the software object (e.g., 5 stars being excellent and 1 star being poor experience of the software object) or selecting a number which is considered to reflect the perceived quality of a software object in a rating scale. An exemplary GUI to input the feedback data of the software object through rating the software object is shown in FIG. 4, which is described in greater detail in FIG. 3.

Figure 5:
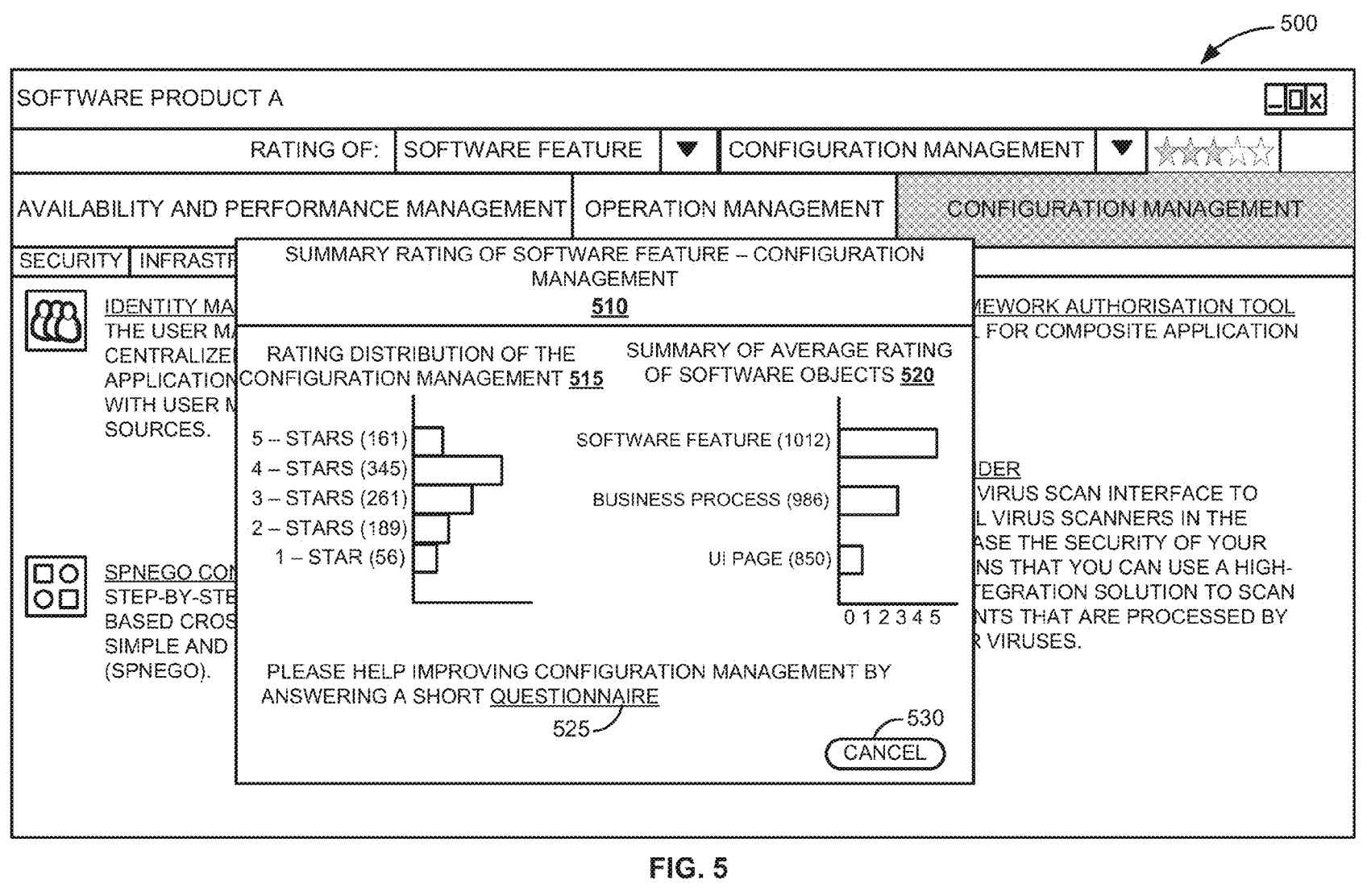

At a second feedback level, a second GUI 220 enables the user to input the feedback data of the software object through a plurality of questionnaire associated with the software object (e.g., 235). For example, the GUI 220 provides an option for the user to answer questions associated with different parameters of the software object such as, but not limited to 'usability', 'performance', 'availability' and 'functional completeness' of the software object. Further, the second GM 220 includes a portion to display evaluation results of the software object based on the feedback data associated with the first feedback level. In other words, an average rating and/or a rating distribution of the software object and associated objects based on ratings provided at the first GUI 215 is displayed (e.g., 240) on the GUI 220. An exemplary GUI to input the feedback data of the software object through the questionnaire and to display the average rating, and the rating distribution of the software object and associated objects corresponding to the first feedback level is shown in FIG. 5, which is described in greater detail in FIG. 3.

At a third feedback level, a third GUI 225 enables the user to input the feedback data of the software object through suggesting development features for the software object (e.g., 245). For example, the GUI 225 provides an option for the user to comment or suggest an improvement feature or a new feature for the software object. Further, the third GUI 225 includes a portion to display evaluation results of the software object based on the feedback data associated with the second feedback level. In other words, a graphical representation of current questionnaire statistics based on answers provided for the questionnaire in the second GUI 220 is displayed (e.g., 250). An exemplary GUI to input the feedback data of the software object through suggesting the development features and to display the average rating and/or the rating distribution of the software object corresponding to the second feedback level is shown in FIG. 9, which is described in greater detail in FIG. 6.

Figure 3:
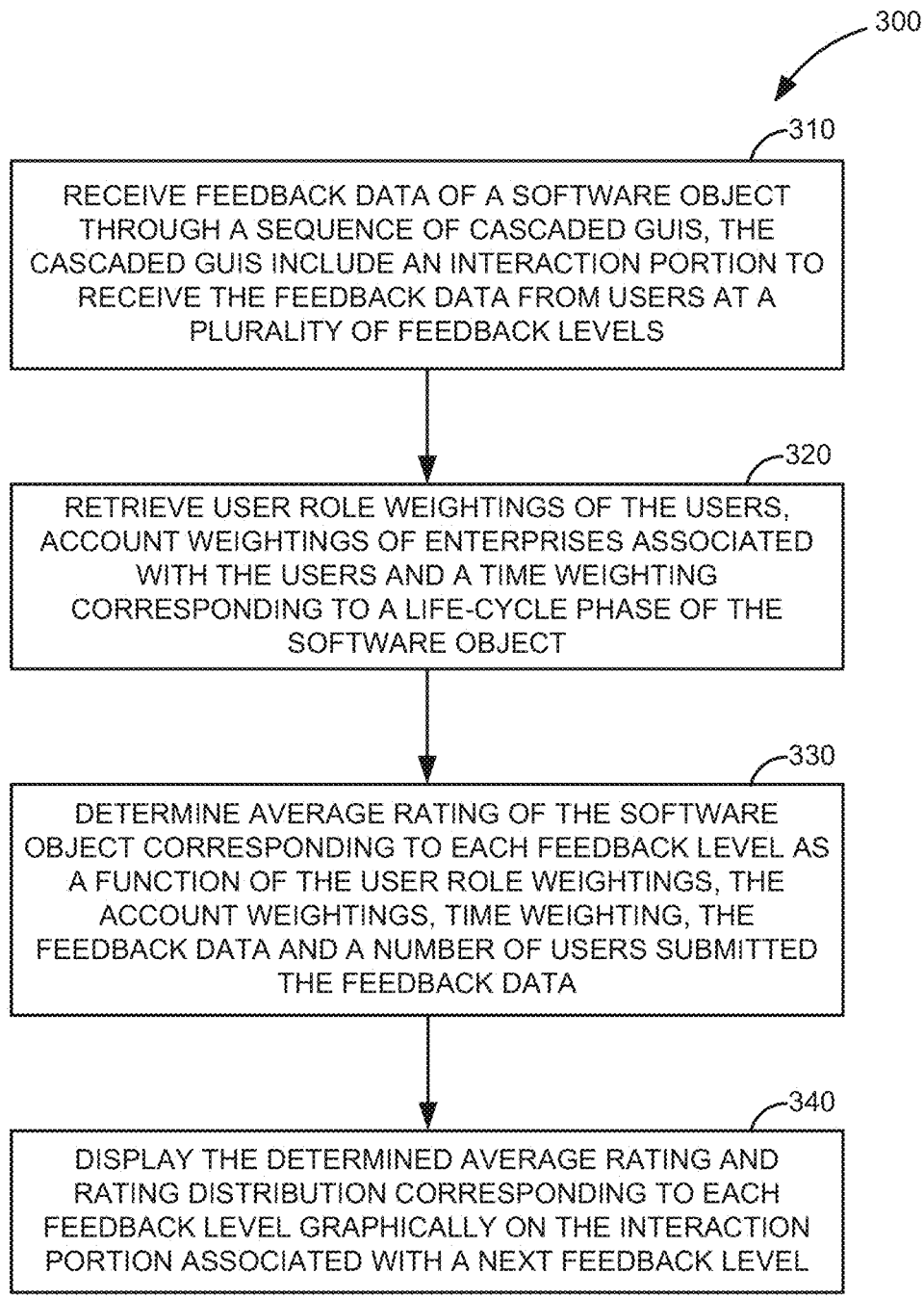
FIG. 3 is a flow diagram illustrating a method of assessing users' feedback data to evaluate a software object, according to an embodiment.
Figure 4:
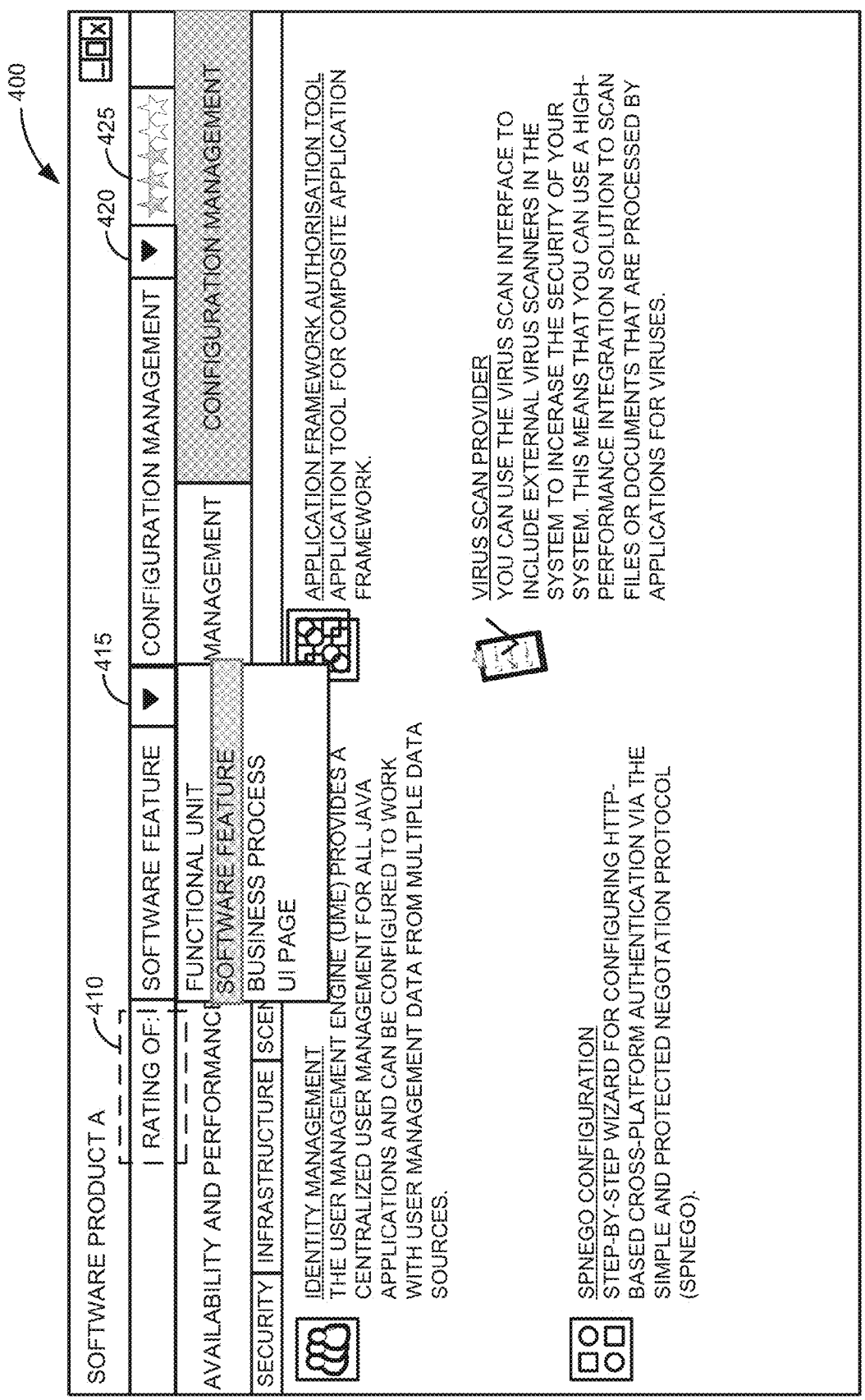
FIG. 4 is an exemplary GUI of a software product A for inputting feedback data at a first feedback level, according to an embodiment.

FIG. 3 is a flow diagram 300 illustrating a method of assessing users' feedback data to evaluate a software object, according to an embodiment. At step 310, the feedback data of a software object is received through a sequence of cascaded computer generated graphical user interfaces (GUIs). In one embodiment, the cascaded GUIs include an interaction portion to receive the feedback data from users at a plurality of feedback levels. The feedback data received at a first feedback level is used as an example for describing the method of evaluating the software object. However, the same method is followed to evaluate the software object corresponding to other feedback levels, which is described in greater detail in FIG. 6.

For example, FIG. 4 is an exemplary graphical user interface (GUI) 400 of a software product A for inputting the feedback data at the first feedback level, according to an embodiment. The GUI 400 renders an option for a user to input the feedback data of the software object through rating (e.g., 410) the software object at the first feedback level. Accordingly, the user can select the software object for which the user desires to provide the feedback data. For example, a drop down menu 415 enables the user to select the software object (e.g., the software object can be, but not limited to a software product, a functional unit, a software feature, a business process, a user interface (UI) page). In the example, the software feature is selected. Further, corresponding software feature (i.e., Configuration Management) is selected through another drop down menu 420. Furthermore, the user can select a number of stars (e.g., 425) corresponding to his/her experience in using the software feature (e.g., 5 stars being excellent and 1 stars being poor experience).

At step 320, user role weightings of the users, account weightings of enterprises associated with the users and a time weighting corresponding to a life-cycle phase of the software object are retrieved. In one embodiment, the user role weightings depend on roles or type of users submitting the feedback data. For example, the type of users can be, but not limited to an end user accessing the software object during standard operations, a software tester accessing the software object during testing phase of the software object, an administrator accessing the software object at a backend and a manager accessing the software object during usability evaluation phase of the software object. Therefore, the sensitivity of the feedback data content depends on the type of users (e.g., role dependence), in one exemplary embodiment, the role of the user is retrieved from authorization profiles. However, when there is no authorization profile of the user is present, the GUI of the software object can provide an option for the users to declare user's role.

In one embodiment, the account weightings of enterprises associated with the users depend on a priority type of an account associated with a software object provider. The priority type of the account can be a top priority account, a medium priority account and a low priority account and the type of the account depends on annual revenue reception from the enterprise, for instance. For example, if the user belongs to the enterprise having the top priority account with the software object provider, the account weighting of enterprise is higher in comparison with the user belonging to the enterprise having the low priority account with the software object provider.

In one embodiment, the time weighting corresponding to the software object defines weighting based on the life-cycle phase of the software object. The life-cycle phase of the software object can be, but not limited to a testing phase, a usability evaluation phase, a phase after upgrade and a phase during standard operations. For example, the feedback data received at the phase during standard operations is given higher weighting than the feedback data received during other phases. Therefore, the users providing the feedback data on the software object will be time sensitive. For example, the feedback data received when there are modifications to the software object can be given more weighting and also the reception of the feedback data can be turned off when the software object have run long enough to reach equilibrium. Hence, weighting factors such as the user role weightings, the account weightings of enterprises and the time weighting are retrieved to reflect the realities and requirements of the feedback data.

At step 330, average rating of the software object corresponding to each feedback level is determined as a function of the user role weightings, the account weightings, the time weighting, the feedback data corresponding to a feedback level and a number of users submitted the feedback data, in one embodiment, the average rating of the software object is determined using Equation (1).

$$S = \frac{1}{n}\sum_{i=1}^{n} S_i^{jkl} W_j W_k W_l \quad (1)$$

Where,
S: Average rating of the software object
n: Number of users who submitted the feedback data
$S_i^{jkl}$: Feedback data of a user who belongs to user role j and enterprise k and provided the feedback data in a time period of criticality l.
$W_j$: User role weighting of the user who provided the feedback data.
$W_k$: Account weighting of an enterprise associated with the user.
$W_l$: Time weighting of the software object.

For instance, the value of ::he average rating of the software object can be 1≤S≤5, The feedback data of the user can be $1 \leq S_i^{jkl} \leq 5$. Further, the user role weighting, the account weighting and the time weighting can be $0 \leq W_j, W_k, W_l \leq 1$.

In the example, the average rating of the software object corresponding to the first feedback level is determined based on the feedback data received through the GUI 400 and using Equation (1).

At step 340, the determined average ratings and rating distribution corresponding to each feedback level is displayed graphically on the interaction portion associated with a next feedback level. The rating distribution of the software object projects rating as submitted by the users. For example, FIG. 5 is an exemplary GUI 500 displaying determined average rating and rating distribution of a software object corresponding to the first feedback level, according to an embodiment. The GUI 500 displays an interactive portion 510 to display summary rating of the software feature 'Configuration Management'. Further, the average rating of 'Configuration Management 520' viewed contextually in ids embodiment as software feature, business process or UI page as determined in step 330 is displayed graphically using different types of charts such as, but not limited to a bar chart, a pie chart, a column chart, a line chart and a scatter chart. In one exemplary embodiment, a rating distribution of the software feature 'Configuration Management' 515 is displayed graphically on the interactive portion 510. The rating distribution projects ratings as provided by number of users of the software object (e.g., 161 users provided 5 star rating, 345 users provided 4 star rating and so on). Therefore, the GUI 500 provides statistically robust and contextually comprehensive data about the software object to the users corresponding to the first feedback level (e.g., star rating of the software object 425 of FIG. 4). Similarly, the average rating and the rating distribution of the software object corresponding to a second feedback level and a third feedback level is determined and displayed, which is described with an example in FIG. 6. Further, the GUI 500 provides an option for the users to input the feedback data corresponding to the second feedback level, which is described in greater detail in FIG. 6.

Figure 6:
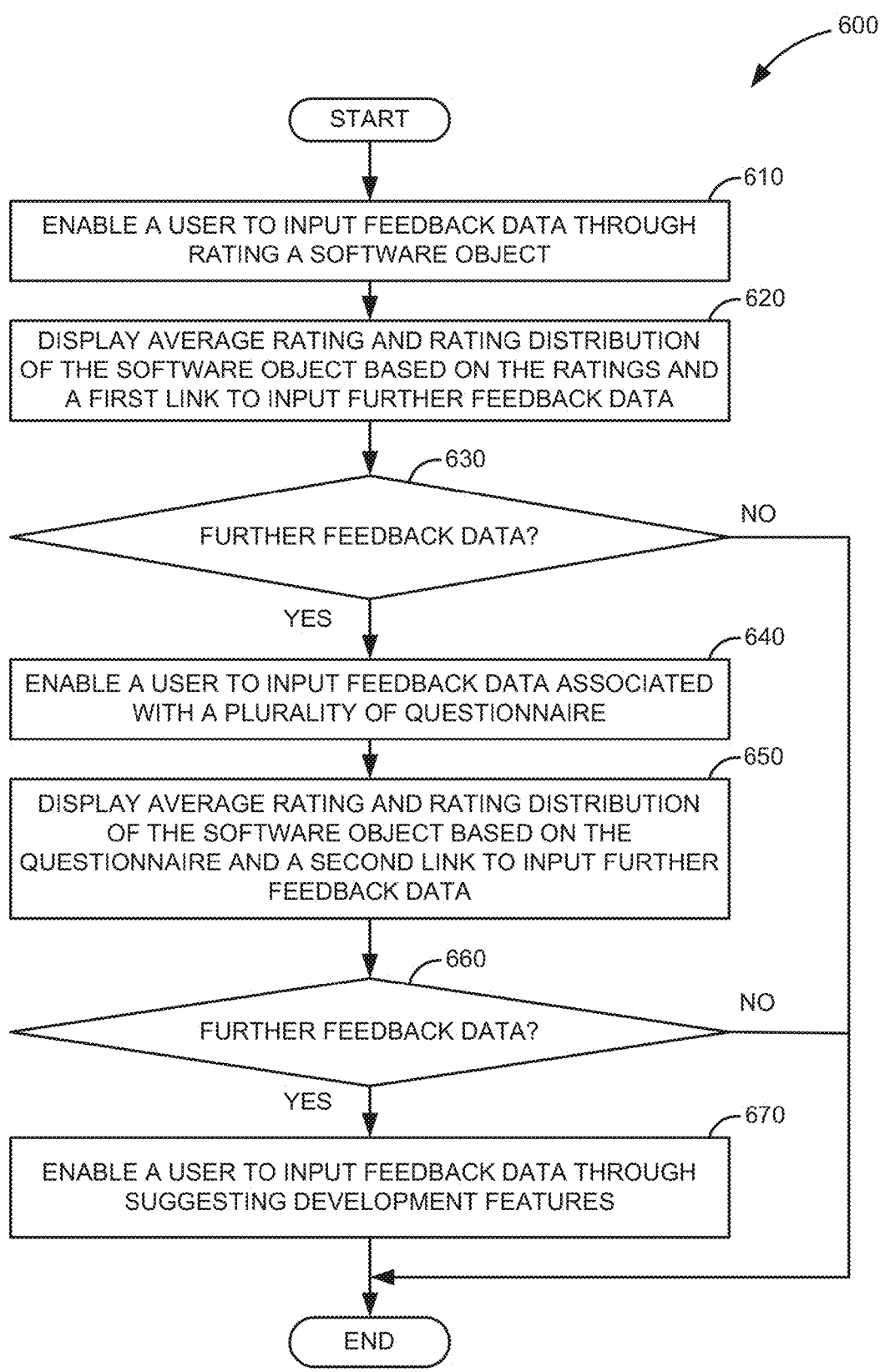
FIG. 6 is a flow diagram illustrating a method of capturing users' feedback data of a software object through a sequence of cascaded GUIs, according to an embodiment.

FIG. 6 is a flow diagram 600 illustrating a method of capturing users' feedback data of a software object through a sequence of cascaded GUIs, according to an embodiment. At process block 610, a GUI enables the user to input the feedback data of the software object through rating the software object at a first feedback level. For example, a user can rate the software object by assigning a number of stars to the software object (e.g., 5 stars being excellent and 1 star being poor experience) as described in FIG. 4. Alternatively, any other methods, such as rating scale, can also he used to rate the software object.

At process block 620, the GUI displays an average rating, and a rating distribution of the software object and associated objects based on the feedback data received through the first GUI as described in FIG. 5 with respect to step 340 of FIG. 3. Further, the GUI provides a first link to input further feedback data. For example, in FIG. 5, a first link 525 is provided to input the second feedback level through answering the questionnaire.

At process block 630, a check is made to determine whether the user desire to provide further feedback data. For example, the check is made to determine whether the user has clicked the first link 525 of FIG. 5 to provide input to the second feedback level through answering; the questionnaire. In one exemplary embodiment, when the user does not desire to provide any further feedback data, the user can choose to exit the process by selecting 'cancel' 530 of FIG. 5 option.

Figure 7:
FIG. 7 is an exemplary GUI displaying an option to choose a type of software object to provide feedback data corresponding to a second feedback level, according to an embodiment.

At process block 640, the GUI enables the user to input the feedback data of the software object at the second feedback level through a plurality of questionnaire associated with the software object. For example, FIG. 7 is an exemplary GUI 700 displaying an option to choose a type of software object to provide feedback data corresponding to the second feedback level, according to an embodiment. The GUI 700 provides an option 710 for the user to choose the type or context or granularity of the software object (e.g., the software object can be, but not limited to a software product, a software functional unit, a software feature, a business process and a UI page) for which the user desires to answer the questionnaire. In the example, the user chooses to provide answers to the questionnaire for the software object 'product A' by selecting 'software product' (e.g., 720). Accordingly, a set of questionnaire associated with the 'product A' is displayed as shown in FIG. 8. The questionnaire displayed in an exemplary GUI 800 of FIG. 8 is associated with different parameters such as, but not limited to 'usability', 'performance', 'availability' and 'functional completeness' of the 'product A'. Further, the user can provide the second level of feedback data by answering the questionnaire (e.g., rating by selecting 'poor', 'moderate', 'good', 'very good' and 'excellent' as shown in FIG. 8). Further, the GUI 800 provides a link 810 to view the average rating and/or the rating distribution of the software object corresponding to the second feedback level, which is described in process block 650.

At process block 650, the GUI displays the average rating and/or the rating distribution of the software object based on the feedback data of the second feedback level. The overall average rating of the software object corresponding to the feedback data of the second feedback level is determined using Equation (1) as described in step 340 of FIG. 3. Further, the GUI provides a second link to input further feedback data. For example, FIG. 9 is an exemplary GUI 900 displaying the rating distribution of the software object based on the questionnaire statistics (e.g., 910). Further, the GUI displays an option to input feedback data at the third feedback level, according to an embodiment. For example, the GUI 900 provides the second link 920 to input the feedback data of the software object at the third feedback level through suggesting 'development features'.

At process block 660, a check is made to determine whether the user desire to provide further feedback data. For example, the check is made to determine whether the user has clicked the link 920 of FIG. 9 to provide input to the third feedback level through suggesting the development features. In one exemplary embodiment, when the user does not desire to provide any further feedback data, the user can choose to exit the process by selecting 'cancel' 930 of FIG. 9 option.

At process block 670, the GUI enables the user to input the feedback data of the software object at the third feedback level through suggesting development features associated with the software object. For example, a space to suggest the development feature is provided on the GUI. Therefore, a software provider can consolidate the received suggestion and implement in future developments to improve the software products.

FIG. 10 is an exemplary graphical representation 1000 illustrating correlation between a number of users and an average rating of a software object, according to an embodiment. The displayed average rating of the software object as described in process blocks 620 and 650 of FIG. 6 are used for different intervention into the software object. For example, as the determined average rating depends on the number of users submitting the feedback data as described in FIG. 330 of FIG. 3, analysts of the feedback data can prioritize their response according to a number of affected users. In one exemplary embodiment, the correlation between the number of users and the average star rating is applied to identify priority area for intervention. In the graphical representation 1000, x-axis represents the number of users (N) using the software object and y-axis represents the average rating (S) of the software object. It is observed that the average qualitative rating of the software object has to be evaluated together with the actual quantitative usage of the software object For example, a portion 1005 depicts the software object used by higher number of users (e.g., above $10^3$ users) and have poor average rating (e.g., below 3 rating). Further, another portion 1010 depicts the software object used by lesser number of users (e.g., below $10^3$ users) and have poor average rating (e.g., below 3 rating). Furthermore, portions 1015 and 1020 depicts the software object used by higher number of users (e.g., portion 1015: above $10^3$ users) and lesser number of users (e.g., portion 1020: above $10^3$ users) having good average rating (e.g., above 3 rating). Through the graphical representation 1000, both software objects depicted in portions 1005 and 1010 need to be fixed in order to improve user acceptance. However, when resources are limited, the software object corresponding to the portion 1005 would be fixed first because it affects more users than the software object corresponding to the portion 1010.

Sonic embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 11:
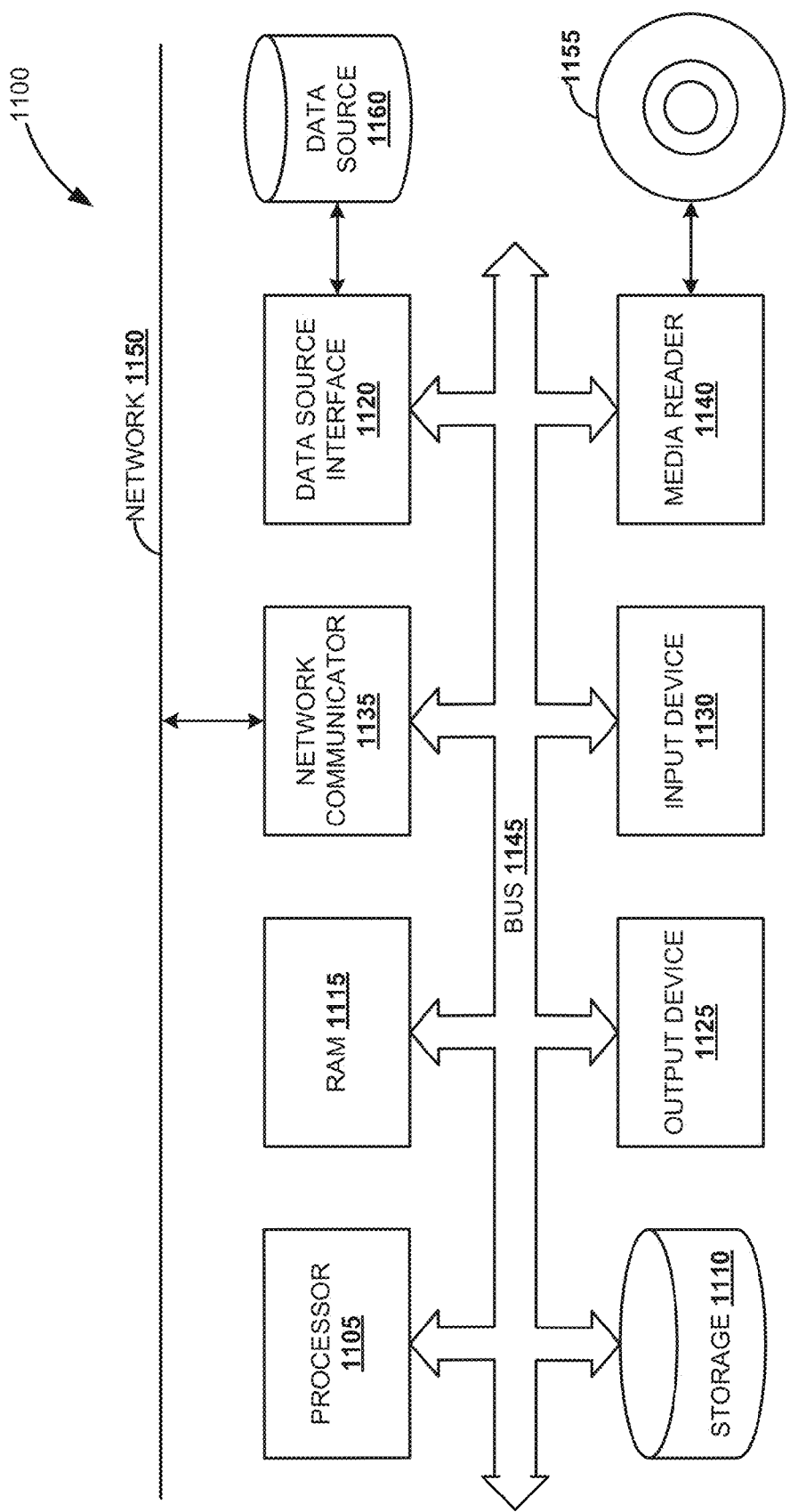
FIG. 11 is a block diagram of an exemplary computer system, according to an embodiment.

FIG. 11 is a block diagram of an exemplary computer system 1100. The computer system 1100 includes a processor 1105 that executes software instructions or code stored on a computer readable storage medium 1155 to perform the above-illustrated methods. The processor 1105 can include a plurality of cores. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. According to some embodiments, such as some in-memory computing system embodiments, the RAM 1115 can have sufficient storage capacity to store much of the data required for processing in the RAM 1115 instead of in the storage 1110. In some embodiments, of the data required for processing may be stored in the RAM 1115. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can he practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following, claims, which are to be interpreted in accordance with established doctrines of claim construction.

What is claimed is:

1. A non-transitory computer-readable medium storing instructions, which when executed cause a computer system to:
receive feedback data of a software object through a sequence of cascaded computer generated graphical user interfaces (GUIs), wherein the sequence of cascaded GUIs having interaction portions to receive the feedback data from users at a plurality of feedback levels comprises a first GUI enabling the users to input the feedback data through rating the software object at a first feedback level, a second GUI enabling the users to input the feedback data associated with a plurality of questionnaires at a second feedback level and a third GUI enabling the users to input the feedback data through suggesting development features at a third feedback level;
retrieve user role weightings of the users, account weightings of enterprises associated with the users and a time weighting corresponding to a life-cycle phase of the software object, wherein the user role weightings depend on roles of the users submitting the feedback data and the account weightings depend on priority types of accounts associated with software object providers;
determine average rating of the software object corresponding to each feedback level as a function of the user role weightings, the account weightings, the time weighting, the feedback data corresponding to a feedback level and a number of users submitting the feedback data; and
return the determined average ratings corresponding to each feedback level graphically on an interaction portion associated with a next feedback level to evaluate the software object, wherein the second GUI graphically displays the determined average rating and rating distribution of the software object corresponding to the rating of the software object in the first feedback level and the third GUI graphically displays the determined average rating and rating distribution of the software object corresponding to the plurality of questionnaires received in the second feedback level.

2. The non-transitory computer-readable medium of claim 1, wherein the software object comprises at least one of a software product, a functional unit of the software product, a software feature of the software product and a business process of the software product.

3. The non-transitory computer-readable medium of claim 1, wherein the roles of the users comprise an end user, a tester, an administrator and a manager.

4. The non-transitory computer-readable medium of claim 1, wherein the priority types of the accounts comprise a top priority account, a medium priority account and a low priority account.

5. The non-transitory computer-readable medium of claim 1, wherein the life-cycle phase of the software object comprises at least one of a testing phase, a usability evaluation phase, a phase after upgrade and a phase during standard operations.

6. The non-transitory computer-readable medium of claim 1, further comprising instructions, which when executed cause the computer system to display a rating distribution of the software object corresponding to each feedback level.

7. A computer implemented method to assess users' feedback data to evaluate a software object, the method comprising:
receiving feedback data of the software object through a sequence of cascaded computer generated graphical user interfaces (GUIs), wherein the sequence of cascaded GUIs having interaction portions to receive the feedback data from users at a plurality of feedback levels comprises a first GUI enabling the users to input the feedback data through rating the software object at a first feedback level, a second GUI enabling the users to input the feedback data associated with a plurality of questionnaires at a second feedback level and a third GUI enabling the users to input the feedback data through suggesting development features at a third feedback level;
retrieving user role weightings of the users, account weightings of enterprises associated with the users and a time weighting corresponding to a life-cycle phase of the software object, wherein the user role weightings depend on roles of the users submitting the feedback data and the account weightings depend on priority types of accounts associated with software object providers;
determining average rating of the software object corresponding to each feedback level as a function of the user role weightings, the account weightings, the time weighting, the feedback data corresponding to a feedback level and a number of users submitting the feedback data; and
displaying the determined average ratings corresponding to each feedback level graphically on an interaction portion associated with a next feedback level to evaluate the software object, wherein the second GUI graphically displays the determined average rating and rating distribution of the software object corresponding to the rating of the software object in the first feedback level and the third GUI graphically displays the determined average rating and rating distribution of the software object corresponding to the plurality of questionnaires received in the second feedback level.

8. The computer implemented method of claim 7, wherein the software object comprises at least one of a software product, a functional unit of the software product, a software feature of the software product and a business process of the software product.

9. The computer implemented method of claim 7, wherein the roles of the users comprise an end user, a tester, an administrator and a manager.

10. The computer implemented method of claim 7, wherein the account priority types of the accounts comprise a top priority account, a medium priority account and a low priority account.

11. The computer implemented method of claim 7, wherein the life-cycle phase of the software object comprises at least one of a testing phase, a usability evaluation phase, a phase after upgrade and a phase during standard operations.

12. The computer implemented method of claim 7, further comprising displaying a rating distribution of the software object corresponding to each feedback level.

13. A system to assess users' feedback data to evaluate a software object, the system comprising:
at least one processor, and
one or more memory devices communicative with the at least one processor, wherein the one or more memory devices store instructions to:

receive feedback data of a software object through a sequence of cascaded computer generated graphical user interfaces (GUIs), wherein the sequence of cascaded GUIs having interaction portions to receive the feedback data from users at a plurality of feedback levels comprises a first GUI enabling the users to input the feedback data through rating the software object at a first feedback level, a second GUI enabling the users to input the feedback data associated with a plurality of questionnaires at a second feedback level and a third GUI enabling the users to input the feedback data through suggesting development features at a third feedback level;

retrieve user role weightings of the users, account weightings of enterprises associated with the users and a time weighting corresponding to a life-cycle phase of the software object, wherein the user role weightings depend on roles of the users submitting the feedback data and the account weightings depend on priority types of accounts associated with software object providers;

determine average rating of the software object corresponding to each feedback level as a function of the user role weightings, the account weightings, the time weighting, the feedback data corresponding to a feedback level and a number of users submitting the feedback data; and return the determined average ratings corresponding to each feedback level graphically on an interaction portion associated with a next feedback level to evaluate the software object, wherein the second GUI graphically displays the determined average rating and rating distribution of the software object corresponding to the rating of the software object in the first feedback level and the third GUI graphically displays the determined average rating and rating distribution of the software object corresponding to the plurality of questionnaires received in the second feedback level.

14. The system of claim 13, wherein the software object comprises at least one of a software product, a functional unit of the software product, a software feature of the software product and a business process of the software product.

15. The system of claim 13, wherein the roles of the users comprise an end user, a tester, an administrator and a manager.

16. The system of claim 13, wherein the priority types of the accounts comprise a top priority account, a medium priority account and a low priority account.

17. The system of claim 13, wherein the life-cycle phase of the software object comprises at least one of a testing phase, a usability evaluation phase, a phase after upgrade and a phase during standard operations.

\* \* \* \* \*